(12) United States Patent
Paudice et al.

(10) Patent No.: US 7,404,711 B2
(45) Date of Patent: Jul. 29, 2008

(54) APPARATUS FOR EXTRUDING A PROFILE ON A GLAZING

(75) Inventors: Ciro Paudice, Vasto (IT); Saverio Lomartire, Turin (IT); Ginetto Biginato, Collegno (IT); Sergio Pulcini, Volpiano (IT)

(73) Assignees: Pilkington Italia S.p.A., San Salvo CH (IT); NKE S.p.A., Alpignano (TO) (IT)

( * ) Notice: Subject to any disclaimer, the term of this patent is extended or adjusted under 35 U.S.C. 154(b) by 18 days.

(21) Appl. No.: 10/469,595

(22) PCT Filed: Feb. 26, 2002

(86) PCT No.: PCT/EP02/02034

§ 371 (c)(1),
(2), (4) Date: Feb. 27, 2004

(87) PCT Pub. No.: WO02/070229

PCT Pub. Date: Sep. 12, 2002

(65) Prior Publication Data

US 2004/0126528 A1 Jul. 1, 2004

(30) Foreign Application Priority Data

Mar. 2, 2001 (EP) .................................. 01830147

(51) Int. Cl.
*B29C 47/00* (2006.01)
*B29C 65/00* (2006.01)
(52) U.S. Cl. .................... 425/382.3; 425/113; 264/252; 156/107; 156/546

(58) Field of Classification Search ................. 425/113, 425/127, 382.3; 156/107, 500, 244.11, 546; 264/252, 259, 271.1
See application file for complete search history.

(56) References Cited

U.S. PATENT DOCUMENTS 4,826,547 A * 5/1989 Lenhardt ..................... 156/109

(Continued)

FOREIGN PATENT DOCUMENTS

DE 296 13 762 U1 12/1996

(Continued)

OTHER PUBLICATIONS

Notification of Transmittal of Copies of Translation of the International Preliminary Examination Report.

*Primary Examiner*—Maria Veronica D Ewald
(74) *Attorney, Agent, or Firm*—Buchanan, Ingersoll & Rooney PC

(57) ABSTRACT

Apparatus for extruding a profile on a glazing comprises drive means on which is mounted an extrusion head with an extrusion nozzle, and means for rotating the nozzle relative to the drive means. The apparatus may be used in a process which comprises extruding the profile through the nozzle while it is being moved by the drive means along a first edge of a glazing, around a corner of the glazing and along a second edge of the glazing, the nozzle being rotated relative to the drive means as it moves around the corner. The extruded profile comprises a first edge portion extending along a first edge of the glazing, a sharp corner portion extending around a sharp corner of the glazing and a second edge portion extending along a second edge region of the glazing, the portions of the profile being continuous.

10 Claims, 2 Drawing Sheets

U.S. PATENT DOCUMENTS

| | | | |
|---|---|---|---|
| 5,000,988 A * | 3/1991 | Inoue et al. | 427/8 |
| 5,108,526 A | 4/1992 | Cornils et al. | |
| 5,273,704 A * | 12/1993 | Scholl et al. | 264/252 |
| 5,316,829 A * | 5/1994 | Cordes et al. | 428/192 |
| 5,336,349 A * | 8/1994 | Cornils et al. | 156/107 |
| 5,362,428 A * | 11/1994 | Tsujino et al. | 264/40.5 |
| 5,507,994 A | 4/1996 | Cornils et al. | |
| 5,529,655 A * | 6/1996 | Bravet et al. | 156/244.17 |
| 5,554,325 A * | 9/1996 | Kotte et al. | 264/37.26 |
| 5,632,939 A * | 5/1997 | Ito et al. | 264/40.5 |
| 5,744,172 A * | 4/1998 | Todaka et al. | 425/113 |
| 5,876,554 A * | 3/1999 | Lafond | 156/500 |
| 5,961,759 A | 10/1999 | Schubert | |
| 5,980,666 A * | 11/1999 | Roth et al. | 156/107 |
| 6,231,327 B1 * | 5/2001 | Shanahan et al. | 425/113 |
| 6,494,245 B1 * | 12/2002 | Simone | 156/578 |
| 6,558,146 B1 * | 5/2003 | Shah et al. | 425/113 |
| 6,776,944 B2 * | 8/2004 | Kelman et al. | 264/138 |
| 6,824,722 B1 * | 11/2004 | Cornils et al. | 264/259 |
| 6,852,186 B1 * | 2/2005 | Matsuda et al. | 156/230 |

FOREIGN PATENT DOCUMENTS

| | | |
|---|---|---|
| DE | 29613762 | 12/1996 |
| EP | 0 831 202 A2 | 3/1998 |
| EP | 0 823 318 B1 | 3/2000 |
| EP | 0 716 208 B1 | 5/2000 |
| EP | 0 823 531 B1 | 10/2001 |
| JP | 6-156337 A | 6/1994 |
| WO | WO 00/67915 A | 11/2000 |

* cited by examiner

APPARATUS FOR EXTRUDING A PROFILE ON A GLAZING

FIELD OF THE INVENTION

The present invention relates to apparatus and processes for extruding profiles on to glazings, and glazings having extruded profiles.

BACKGROUND DISCUSSION

It is known to provide glazings, in particular vehicle glazings, with extruded profiles around the margin of the glazing. Profiles on vehicle glazings act as weather seals, and improve the appearance of glazings when the glazings are in position in a vehicle body. Profiles may also be used to receive and retain an adhesive bead used in fixing the glazing in position in the vehicle body. The material used for extruded profiles usually comprises a suitable polymer, for example, polyurethane or a thermoplastic elastomer.

The conventional extrusion process for extruding polymer profiles on to glazings, usually involves extruding the polymer material through an extrusion nozzle, incorporated in an extrusion head, whilst the head is driven along a path along which it is desired to extrude the profile. The extrusion head is usually driven by a robot which is programmed to follow the extrusion path.

Unfortunately, there are disadvantages associated with conventional extrusion.

When extruding a profile on a curve, for example around a corner of a glazing, there is a difference in circumference between the inner and outer edge of the profile. As a consequence of this, extruded profiles can exhibit imperfections at corners, a problem which is particularly acute with sharp corners (i.e. a corner having a small radius or width).

The problem of extruding on a curve, especially around sharp corners, has been addressed in U.S. Pat. No. 5,108,526. U.S. Pat. No. 5,108,526 discloses a polymer extrusion die apparatus wherein polymer is supplied to the die head by means of at least one supply line. The supply line(s) delivers polymer under pressure to at least one supply channel, at least one of which includes means for controlling the flow of polymer therethrough. By using the means for controlling the flow of polymer through a supply channel, the flow of polymer through the inner or outer portion of the die orifice can be controlled. On a corner, the supply channel to the outer portion of the die is controlled to have a higher polymer flow than the inner portion resulting in an improved profile being extruded.

However, there is a further problem in extruding profiles on curves, especially extruding around sharp corners. Commercially available robots typically have six axes of motion which may be insufficient to allow precise extrusion around relatively sharp corners. Thus, it may be difficult to extrude a profile which follows the edge of the glazing precisely when the profile is to be extruded around a relatively sharp corner.

U.S. Pat. No. 5,316,829 discloses extruding a profile on a glazing and then after extrusion, and in a separate step, completing the profile with a complementary component. This is accomplished by using a mould that rests on the glazing, connecting the mould to the profile and injecting into the mould a hardenable material which adheres to the polymer. U.S. Pat. No. 5,316,829 further discloses that where a glazing has a pointed corner where it is difficult to extrude a profile, it is possible to stop the extrusion in the corner, or if the profile has already been produced, to remove the profile after hardening, and to complete or repair it by casting the profile part.

This procedure has disadvantages in that moulding corner parts in a separate step complicates manufacturing and is expensive. Furthermore, a moulded corner will either consist of a material different to that of the extruded profile, or will consist of the same material but produced using different process parameters to those used to produce the extruded profile. As a consequence, the corner portion and the extruded portion of the profile may have different material properties including different adhesion properties. For example, they may exhibit different wettability to adhesives and/or to water (e.g. rain water) and may have different ageing properties. Also, the primer used to bond the material to glass may be degraded by the heat generated by the mould, or may consist of a different material and therefore the adhesion value may be different from that of the extruded profile. Such a difference in materials properties and/or adhesion properties results in the profiled glazing being less reliable in use and in the interface between the corner portion and extruded portion being visible as a seam in the profile. A seam in the profile is unattractive and, therefore, undesirable in a commercial product.

SUMMARY

An aim of the present invention is to address the problem of extruding around curves, especially sharp corners, and to mitigate disadvantages associated with the prior art.

The present invention accordingly provides, in a first aspect, apparatus for extruding a profile on a glazing, the apparatus comprising an extrusion head having an extrusion nozzle through which the profile may be extruded, the extrusion head being mounted on drive means for moving the extrusion head, characterised by rotation means arranged to rotate the extrusion nozzle relative to the drive means.

This is advantageous because rotating the nozzle relative to the drive means allows the extrusion head to extrude around corners, especially sharp corners. Thus, a continuous profile may be extruded around corners, which will tend to provide a more reliable part because the corner profiles will be made of the same material (extruded under very similar processing conditions) to at least part of the rest of the profile.

The drive means will usually comprise a robot. If the drive means comprises a conventional robot with six axes of movement, the independent rotation axis will provide a seventh axis of movement associated with the extrusion head.

Normally, the extrusion head will further comprise an inlet for coupling the head to a supply of the material to be extruded. In such a case, it is advantageous if the rotation means is arranged to rotate the extrusion nozzle relative to the inlet, because then the inlet and material supply (and/or a material supply hose coupled to the inlet) need not rotate when the nozzle does. Rotation relative to the inlet may be achieved if the rotation means comprises a shaft connected to the nozzle at a one end and rotatably mounted to the inlet portion of the extrusion head at the other end.

Preferably, the rotation means is arranged to rotate the extrusion nozzle about an axis passing through the body of the extrusion head. More preferably, the rotation means is arranged to rotate the extrusion nozzle about an axis passing through the extrusion nozzle, most preferably through the centre of the extrusion nozzle.

The apparatus may further comprise a motor for rotating the rotation means. The motor will preferably be controllable via the robot controller (i.e. the programme and/or processor which controls the robot itself).

To improve the flow of the material to be extruded, the apparatus may further comprise heating means to maintain the material to be extruded at a pre-determined temperature.

The part of the apparatus which is most usefully maintained at a pre-determined temperature is the extrusion nozzle. If present, the inlet and/or the shaft may also be maintained at a pre-determined temperature (which may be the same or different to the temperature of the nozzle) by the heating means.

The invention also provides an extrusion head for extruding a profile on to a glazing, the extrusion head comprising an extrusion nozzle through which the profile may be extruded, characterised by rotation means forming part of the extrusion head, the rotation means being arranged to rotate the extrusion nozzle.

The present invention provides, in a second aspect, a process for extruding a profile on to a glazing comprising, extruding the profile through an extrusion nozzle while the extrusion nozzle is being moved by drive means along a first edge region of the glazing, around a corner region of the glazing and along a second edge region of the glazing, characterised by rotating the extrusion nozzle relative to the drive means as the extrusion nozzle is moved around the corner region of the glazing.

This is advantageous because the process will thereby provide a continuous profile which will have substantially identical material properties in the corner and edge portions of the profile, and which will, therefore, improve the reliability of the profile.

Glazings on which profiles are extruded may be flat or curved and it is advantageous if the profile is extruded whilst the extrusion nozzle is rotated about a rotation axis which is maintained in a substantially orthogonal (i.e. perpendicular) orientation to the surface of the glazing as the profile is being extruded.

However, in some embodiments of the invention, the angle of the rotation axis may be varied away from an orthogonal orientation as the nozzle moves along the extrusion path. This is advantageous because the rotation of the nozzle about the rotation axis can thereby be advanced or delayed before approaching a corner, which provides finer control over the profile, and may enable even narrower corners to be extruded. The angle of the axis with respect to the surface of the glazing will usually be varied in the plane of the extrusion path.

Preferably, the process further comprises maintaining the material to be extruded at a pre-determined temperature before extrusion. The pre-determined temperature will depend on the properties of the material to be extruded and, usually, the pre-determined temperature will be in the range 30° C. to 240° C. For example, the pre-determined temperature may be in the range 30° C. to 140° C. or in the range 140° C. to 240° C.

The material extruded by the process will normally be a polymer material, comprising, for example, polyurethane (in which case the pre-determined temperature range is preferably in the range 30° C. to 140° C.) or a thermoplastic elastomer (in which case the pre-determined temperature range is preferably in the range 140° C. to 240° C.). Especially suitable thermoplastic polymers are vulcanised thermoplastic polymers, for example those sold under the trade name FORPRENE.

Glazings having extruded profiles obtainable by the process of the invention, have uses in buildings, but will be most often used in vehicle glazings. Vehicle glazings include windscreens, back windows (often referred to as backlights), side windows or sunroofs.

Accordingly, the present invention provides, in a third aspect, a glazing having an extruded profile, the extruded profile comprising a first edge portion extending along a first edge region of the glazing, a sharp corner portion extending around a sharp corner region of the glazing and a second edge portion extending along a second edge region of the glazing, characterised in that the first edge portion, the sharp corner portion and the second edge portion are continuous.

A continuous profile is advantageous because the first edge portion, the corner portion and the second edge portion will have substantially identical material properties, which improves the reliability of the profile. Furthermore, a continuous profile will have no seams between the edge portions and the corner portion which improves the attractiveness of the profile.

The sharp corner portion of the profile will usually have a radius of 5 cm or below, more usually of 3 cm or below and most usually of 2 cm or below.

The profile will usually comprise a polymer, for example polyurethane or a thermoplastic elastomer (especially a vulcanised thermoplastic elastomer).

BRIEF DESCRIPTION OF THE DRAWING FIGURES

By way of illustration, embodiments of the present invention will now be described in more detail with reference to the accompanying drawings in which.

DETAILED DESCRIPTION

Figure 1:
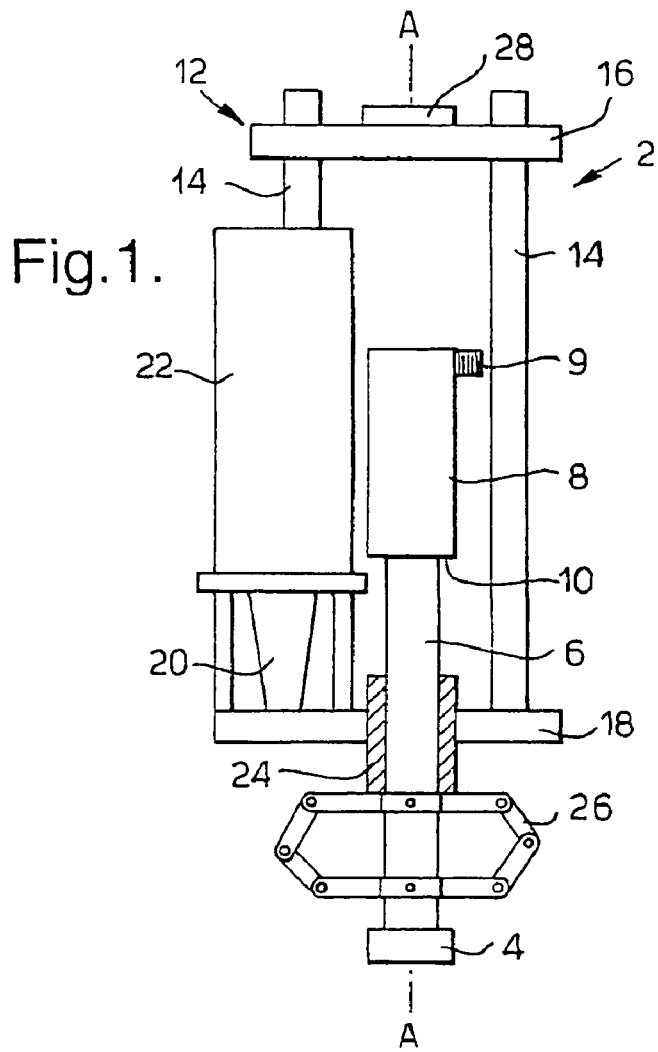
FIG. 1 shows a vertical section through an extrusion head according to the invention.

Referring to FIG. 1, an extrusion head 2 comprises a structural cage 12 of support struts 14, an upper support plate 16 and a lower support plate 18. The lower support plate 18 is hollow and contains gears (not shown) used in the transmission system 20. An inlet portion 8 is mounted on the support cage 12 (for clarity, the mounting are not shown) and has an inlet 9 for coupling the inlet portion 8 of the head 2 to a supply of the material to be extruded. The material will usually be supplied to the head through the inlet 9 by a hose (not shown).

A hollow shaft 6 is coupled to the inlet portion 8 by means of a rotation joint 10 which allows the shaft to rotate, relative to the inlet portion 8, about a rotation axis A. In the embodiment illustrated, the rotation axis A coincides with the longitudinal axis of the nozzle 4 and the shaft 6.

The hollow shaft 6 ends with an extrusion nozzle 4 through which the profile (not shown) may be extruded. The internal arrangement of inlet portion 8, shaft 6 and extrusion nozzle 4 is such that material to be extruded will, under pressure, flow from the inlet portion 8 through the shaft 6 (whether stationary or rotating relative to the inlet portion 8) and through extrusion nozzle 4.

The hollow shaft 6 is coupled by a transmission system 20 (part of which hidden in FIG. 1 by lower support plate 18) to an electric motor 22 which drives the rotation of shaft 6 and nozzle 4. The shaft 6 rotates in a collar 24 where the shaft passes through the lower support plate 18.

A pantograph shock absorber 26 (which comprises a spring mechanism not shown in FIG. 1) is coupled to the shaft 6 between the collar 24 and the nozzle 4. The pantograph 26 is used to keep the pressure of the nozzle 4 against the glass surface constant and thus to maintain a constant distance between the nozzle and the glass surface, independently of any imperfection (e.g. waviness) of the glass edge.

The areas of the extrusion head 2 which will be in contact with the material to be extruded, especially the inlet 9, inlet portion 8, shaft 6 and nozzle 4 are thermo-regulated by heaters (not shown) capable of maintaining a pre-determined temperature in the range room temperature to about 300° C. The other components of the extrusion head 2 which are not heated (and/or which may be adversely affected by heat) will usually be insulated.

The extrusion head 2 as shown in FIG. 1 is fixed to the mounting flange 28 of the operating arm of a robot. The robot is used to drive the extrusion head over the desired extrusion path. Typical commercially available robots have six rotation axes. The extrusion head 2 when fixed to a commercially available robot provides a seventh and independent (i.e. separate to other axes of rotation, for example, the rotation axes of the robot) rotation axis for improved flexibility and control of extrusion, especially around sharp corners of glazings. Usually, the robot will be used to control the rotation of the nozzle 4 of the extrusion head 2 by connecting the motor 22 to the robot (not shown).

During the process of extrusion using the extrusion head 2, the axis A will usually be maintained substantially orthogonal to the surface of the glazing. However, it may be advantageous to vary the angle between the axis (i.e. the independent rotation axis) and the surface of the glazing so as to provide finer control over the extruded profile.

Figure 2A:
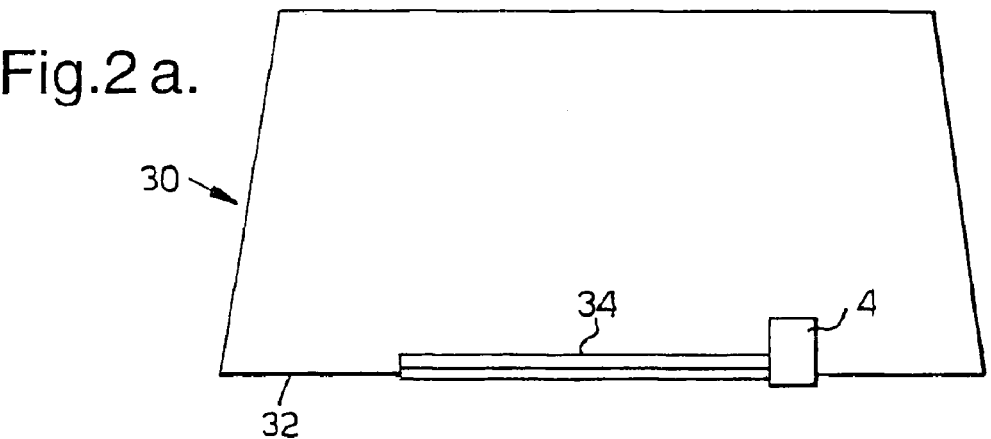
FIGS. 2a, 2b and 2c show schematically, in plan view, a polymer profile being extruded on to a glazing by a process according to the invention.
Figure 2B:
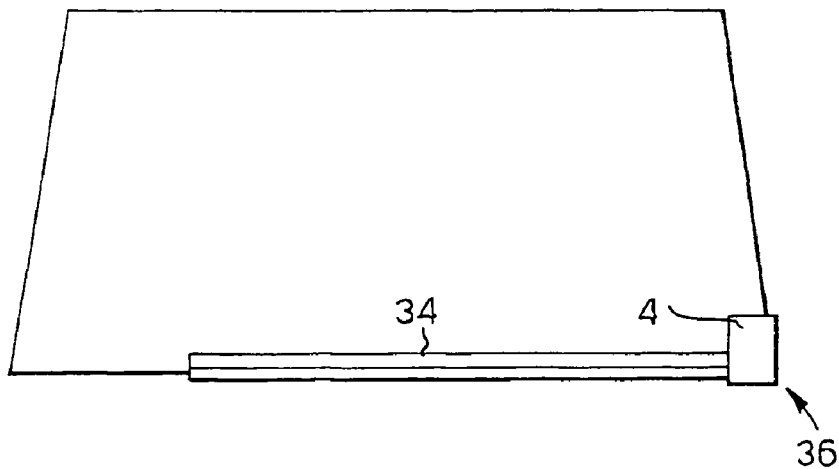
Figure 2C:
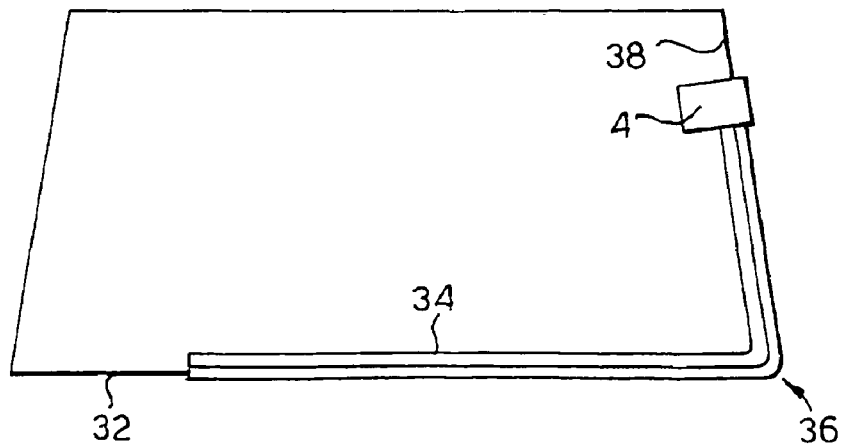

The process of extrusion of a profile on to a glazing (which will usually be either flat or curved glass) is shown schematically in FIGS. 2a, 2b and 2c. Referring to FIG. 2a, a sheet of glass 30 intended as a vehicle glazing has substantially the shape of a trapezium (in practice, the glazing 30 will be bent (i.e. curved) and, in consequence will have slightly curved edges). An extrusion nozzle 4 (for clarity only the extrusion nozzle 4 of the extrusion head 2 is shown in FIG. 2) is driven along the lower edge 32 of the sheet of glass 30 by a robot (not shown). As it is so driven, a polymer profile 34 of a vulcanised thermoplastic elastomer (obtained from So.F.Tter Srl and supplied under the trade name FORPRENE) is extruded along the lower edge 32 by the extrusion nozzle 4 until the nozzle 4 has reached the corner 36 of the sheet of glass 30 (referring to FIG. 2b).

At the corner 36 of the sheet of glass 30, the extrusion nozzle 4 is rotated so that it is orientated to an extrusion path along the right side edge 38 of the sheet of glass 30. The robot drives the extrusion nozzle 4, and the nozzle 4 extrudes polymer profile 34, along the right side edge 38.

As is shown in FIG. 2c, polymer profile 34 is extruded continuously from the extrusion nozzle 4 whilst it is driven along the lower edge 32, around the corner 36 and along the right side edge 38 so that a continuous polymer profile 34 is extruded along those edges and around the sharp corner 36. The polymer profile 34 will be seamless around the corner and the portions of the profile before, around and after the corner will have substantially the same material properties including substantially the same adhesion properties.

Figure 3:
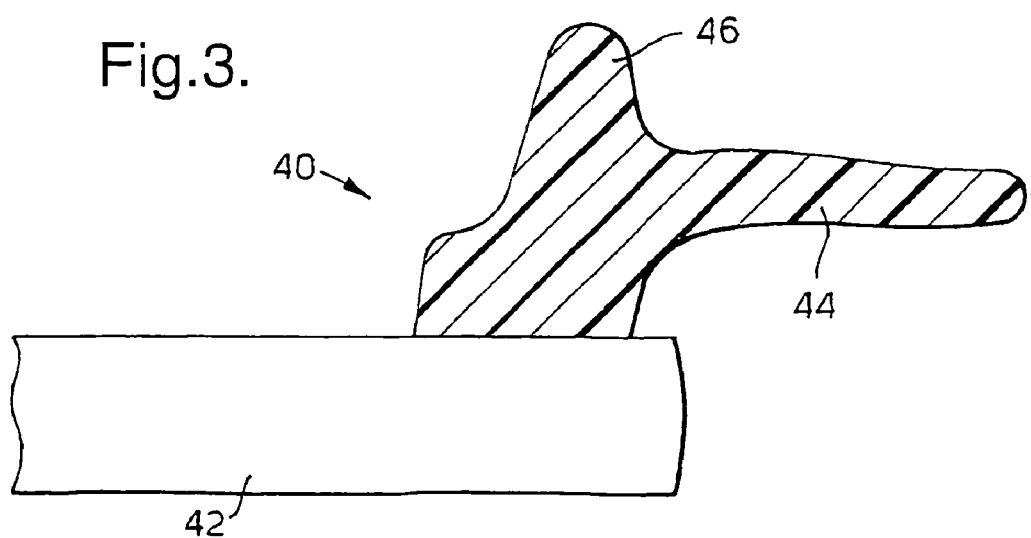
FIG. 3 shows a vertical section through an extruded profile according to the invention.

Referring to FIG. 3, a polymer profile 40 extruded on to the edge of a vehicle glazing 42, of bent and toughened glass, comprises a lip portion 44 projecting over the edge of the glazing and a spacing portion 46 projecting substantially vertically from the surface of the glazing 42. When the glazing 42 is glazed into an opening in a vehicle body (not shown), the spacing portion 46 is intended to space the glazing 42 from the vehicle body. The lip portion 44 is intended to contact an opposed part of the vehicle boy and bend around the edge of the glazing 42 so as to space the glazing efficiently in the opening provided in the vehicle body, form an improved weather seal and to protect the edge of the glazing 42. The polymer profile comprises a vulcanised thermoplastic elastomer but may alternatively be formed by extrusion using any other material known to be suitable for extruding profiles on to glazings, for example, polyurethane.

The invention claimed is:

1. Apparatus for extruding a profile on a glazing, the apparatus comprising an extrusion head having an extrusion nozzle from which the extruded profile is dispensed from the extrusion head and deposited onto the glazing, the extrusion nozzle having a longitudinal axis, the extrusion head being mounted on drive means for moving the extrusion head along the glazing, and rotation means separate from the drive means and operatively connected to the extrusion nozzle for rotatably driving the extrusion nozzle about said longitudinal axis of the extrusion nozzle and independent of movement of the extrusion nozzle by the drive means, the rotation means being spaced from the longitudinal axis of the extrusion nozzle, wherein the drive means comprises a robot.

2. Apparatus as claimed in claim 1, wherein the extrusion head further comprises an inlet coupling the extrusion head to a supply of the material to be extruded.

3. Apparatus as claimed in claim 2, wherein the rotation means rotates the extrusion nozzle about the longitudinal axis relative to the inlet.

4. Apparatus as claimed in claim 1, wherein the extrusion head comprises an inlet portion connected to a hollow shaft, the extrusion nozzle being located at one end of the hollow shaft, the hollow shaft having a longitudinal axis that coincides with the longitudinal axis of the extrusion nozzle.

5. Apparatus as claimed in claim 4, wherein the drive means is operable to move the extrusion nozzle about six rotation axes, the rotation means being operable to rotate the extrusion nozzle about a seventh axis corresponding to the longitudinal axis of the extrusion nozzle.

6. Apparatus as claimed claim 1, further comprising heating means to maintain the material to be extruded at a pre-determined temperature.

7. An extrusion head for extruding a profile on to a glazing under driving movement of a robot, the extrusion head comprising an extrusion nozzle from which the extruded profile is dispensed from the extrusion head and deposited onto the glazing, the extrusion nozzle having a longitudinal axis, rotation means operatively connected to the extrusion nozzle for rotatably driving the extrusion nozzle about the longitudinal axis independent of all driving movement of the extrusion nozzle by the robot, the rotation means being spaced apart from the longitudinal axis of the extrusion nozzle so that the rotation means and the longitudinal axis of the extrusion nozzle are not coaxial with one another.

8. Apparatus for extruding a profile on a glazing, comprising an extrusion head having an extrusion nozzle from which the extruded profile is dispensed from the extrusion head and deposited onto the glazing, the extrusion nozzle having a longitudinal axis about which the extrusion nozzle is rotatable, the extrusion head being connected to drive means for moving the extrusion head along the glazing about a plurality of axes of movement as the profile is extruded from the extrusion nozzle and onto the glazing, and rotation means separate from the drive means and operatively connected to the extrusion nozzle for rotatably driving the extrusion nozzle about said longitudinal axis of the extrusion nozzle, the rotation means rotating the extrusion nozzle about the longitudinal axis independent of all of the axes of movement of the extrusion nozzle by the drive means, the rotation means providing a driving output for rotating the extrusion nozzle that is along an axis separate and spaced from the longitudinal axis of the extrusion nozzle, wherein the drive means comprises a robot.

9. Apparatus as claimed in claim 8, wherein the extrusion head comprises a hollow shaft having one end at which is located the extrusion nozzle, the hollow shaft having a longitudinal axis that coincides with the longitudinal axis of the extrusion nozzle about which the extrusion nozzle rotates.

10. Apparatus as claimed in claim 9, wherein the rotation means comprises a motor which is coupled to the hollow shaft by a transmission system so that operation of the motor results in rotation of the hollow shaft and the extrusion nozzle.

* * * * *